US008676672B2

(12) United States Patent
Nelsen

(10) Patent No.: US 8,676,672 B2
(45) Date of Patent: Mar. 18, 2014

(54) SYSTEMS AND METHODS FOR ELECTRONIC DELIVERY OF STORED VALUE

(75) Inventor: David A. Nelsen, Tigard, OR (US)

(73) Assignee: e2interactive, Inc., Atlanta, GA (US)

( * ) Notice: Subject to any disclaimer, the term of this patent is extended or adjusted under 35 U.S.C. 154(b) by 629 days.

(21) Appl. No.: 12/196,157

(22) Filed: Aug. 21, 2008

(65) Prior Publication Data

US 2009/0055296 A1 Feb. 26, 2009

Related U.S. Application Data

(60) Provisional application No. 60/966,034, filed on Aug. 23, 2007.

(51) Int. Cl.
*G06F 17/00* (2006.01)
*G06F 19/00* (2011.01)
*G06F 7/08* (2006.01)
*G06Q 40/00* (2012.01)
*G06Q 30/06* (2012.01)
G06Q 30/02 (2012.01)
G07F 7/10 (2006.01)

(52) U.S. Cl.
CPC ............ *G06Q 30/0633* (2013.01); *G06Q 40/00* (2013.01); *G06Q 40/10* (2013.01); *G06Q 30/02* (2013.01); *G06Q 30/06* (2013.01); *G07F 7/1008* (2013.01)
USPC ................ 705/30; 705/26.8; 705/39; 705/41; 705/44; 235/375; 235/379; 235/380; 235/381

(58) Field of Classification Search
CPC ... G06Q 30/0633; G06Q 30/06; G06Q 40/10; G06Q 40/02; G06Q 20/10; G06Q 40/00; G06Q 20/102; G06Q 30/02; G07F 7/1008; G07F 20/341; G07F 7/08
USPC ........ 705/64, 39, 14.3, 1.1, 65, 14.38, 75, 44, 705/26.8, 14.34, 30, 41; 235/379, 380
See application file for complete search history.

(56) References Cited

U.S. PATENT DOCUMENTS 4,068,213 A 1/1978 Nakamura et al.
4,482,802 A 11/1984 Aizawa et al.
(Continued)

FOREIGN PATENT DOCUMENTS

EP 0950968 A1 10/1999
EP 1519332 A1 3/2005
(Continued)

OTHER PUBLICATIONS

Eazel, William, "PayPal intros SMS payments," http://www.v3.co.uk/articles/print/2152694, Mar. 24, 2006, Accessed Dec. 31, 2009.

(Continued)

*Primary Examiner* — Olusegun Goyea
(74) *Attorney, Agent, or Firm* — Landmark Intellectual Property Law, PC

(57) ABSTRACT

Systems and methods for electronic delivery of stored value are provided. An example method includes receiving a set of identifiers corresponding to a merchant's stored value tracking system, receiving a request for an electronic value card, associating an identifier from the set of identifiers with the electronic value card, synchronizing the merchant's stored value tracking system with the issued electronic value card, and delivering the electronic value card to a customer. An example system includes a merchant stored value tracking system having a set of unique identifiers, a network communicatively linked with a merchant stored value tracking system; and a value card manager communicatively linked with the network. The value card manager may be configured to receive a request for an electronic value card, synchronize the electronic value card with the merchant stored value tracking system using the unique identifiers, and deliver the electronic value card to a customer for use in the merchant stored value tracking system.

17 Claims, 10 Drawing Sheets

(56) References Cited

U.S. PATENT DOCUMENTS

| | | |
|---|---|---|
| 4,734,858 A | 3/1988 | Schlafly |
| 4,747,049 A | 5/1988 | Richardson et al. |
| 4,755,940 A | 7/1988 | Brachtl et al. |
| 4,767,917 A | 8/1988 | Ushikubo |
| 4,795,892 A | 1/1989 | Gilmore et al. |
| 4,877,947 A | 10/1989 | Mori |
| 4,900,904 A | 2/1990 | Wright et al. |
| 4,908,521 A | 3/1990 | Boggan et al. |
| 4,943,707 A | 7/1990 | Boggan |
| 5,117,355 A | 5/1992 | McCarthy |
| 5,202,826 A | 4/1993 | McCarthy |
| 5,255,182 A | 10/1993 | Adams |
| 5,383,113 A | 1/1995 | Kight et al. |
| 5,384,449 A | 1/1995 | Peirce |
| 5,465,288 A | 11/1995 | Falvey et al. |
| 5,477,038 A | 12/1995 | Levine et al. |
| 5,500,513 A | 3/1996 | Langhans et al. |
| 5,502,765 A | 3/1996 | Ishiguro et al. |
| 5,511,114 A | 4/1996 | Stimson et al. |
| 5,577,109 A | 11/1996 | Stimson et al. |
| 5,590,038 A | 12/1996 | Pitroda |
| 5,621,201 A | 4/1997 | Langhans et al. |
| 5,621,787 A | 4/1997 | McKoy et al. |
| 5,644,721 A | 7/1997 | Chung et al. |
| 5,657,389 A | 8/1997 | Houvener |
| 5,679,938 A | 10/1997 | Templeton et al. |
| 5,679,940 A | 10/1997 | Templeton et al. |
| 5,696,909 A | 12/1997 | Wallner |
| 5,699,528 A | 12/1997 | Hogan |
| 5,705,798 A | 1/1998 | Tarbox |
| 5,721,768 A | 2/1998 | Stimson et al. |
| 5,721,781 A | 2/1998 | Deo et al. |
| 5,732,136 A | 3/1998 | Murphree et al. |
| 5,754,655 A | 5/1998 | Hughes et al. |
| 5,760,381 A | 6/1998 | Stich et al. |
| 5,777,305 A | 7/1998 | Smith et al. |
| 5,806,045 A | 9/1998 | Biorge et al. |
| 5,828,740 A | 10/1998 | Khuc et al. |
| 5,844,972 A | 12/1998 | Jagadish et al. |
| 5,873,072 A | 2/1999 | Kight et al. |
| 5,884,271 A | 3/1999 | Pitroda |
| 5,889,863 A | 3/1999 | Weber |
| 5,903,633 A | 5/1999 | Lorsch |
| 5,903,830 A | 5/1999 | Joao et al. |
| 5,903,874 A | 5/1999 | Leonard et al. |
| 5,909,492 A | 6/1999 | Payne et al. |
| 5,930,363 A | 7/1999 | Stanford et al. |
| 5,945,653 A | 8/1999 | Walker et al. |
| 5,956,695 A | 9/1999 | Carrithers et al. |
| 5,956,700 A | 9/1999 | Landry |
| 5,991,413 A | 11/1999 | Arditti et al. |
| 5,991,748 A | 11/1999 | Taskett |
| 5,991,749 A | 11/1999 | Morrill, Jr. |
| 5,999,624 A | 12/1999 | Hopkins |
| 6,000,608 A | 12/1999 | Dorf |
| 6,012,049 A | 1/2000 | Kawan |
| 6,018,570 A | 1/2000 | Matison |
| 6,021,397 A | 2/2000 | Jones et al. |
| 6,029,151 A | 2/2000 | Nikander |
| 6,032,135 A | 2/2000 | Molano et al. |
| 6,032,859 A | 3/2000 | Muehlberger et al. |
| 6,055,567 A | 4/2000 | Ganesan et al. |
| 6,058,300 A | 5/2000 | Hanson |
| 6,058,382 A | 5/2000 | Kasai et al. |
| 6,062,472 A | 5/2000 | Cheung |
| 6,070,150 A | 5/2000 | Remington et al. |
| 6,088,682 A | 7/2000 | Burke |
| 6,092,053 A | 7/2000 | Boesch et al. |
| 6,098,053 A | 8/2000 | Slater |
| 6,105,008 A | 8/2000 | Davis et al. |
| 6,129,276 A | 10/2000 | Jelen et al. |
| 6,138,106 A | 10/2000 | Walker et al. |
| 6,142,369 A | 11/2000 | Jonstromer |
| 6,167,387 A | 12/2000 | Lee-Wai-Yin |
| 6,169,890 B1 | 1/2001 | Vatanen |
| 6,173,272 B1 | 1/2001 | Thomas et al. |
| 6,175,823 B1 | 1/2001 | Van Dusen |
| 6,185,545 B1 | 2/2001 | Resnick et al. |
| 6,188,752 B1 | 2/2001 | Lesley |
| RE37,122 E | 4/2001 | Levine et al. |
| 6,226,364 B1 | 5/2001 | O'Neil |
| 6,240,397 B1 | 5/2001 | Sachs |
| 6,256,690 B1 | 7/2001 | Carper |
| 6,282,566 B1 | 8/2001 | Lee, Jr. et al. |
| 6,285,749 B1 | 9/2001 | Manto |
| 6,289,322 B1 | 9/2001 | Kitchen et al. |
| 6,295,522 B1 | 9/2001 | Boesch |
| 6,308,887 B1 | 10/2001 | Korman et al. |
| 6,311,165 B1 | 10/2001 | Coutts et al. |
| 6,311,170 B1 | 10/2001 | Embrey |
| 6,314,171 B1 | 11/2001 | Dowens |
| 6,315,195 B1 | 11/2001 | Ramachandran |
| 6,324,525 B1 | 11/2001 | Kramer et al. |
| 6,327,577 B1 | 12/2001 | Garrison et al. |
| 6,330,544 B1 | 12/2001 | Walker et al. |
| 6,332,135 B1 | 12/2001 | Conklin et al. |
| 6,333,976 B2 | 12/2001 | Lesley |
| 6,334,116 B1 | 12/2001 | Ganesan et al. |
| 6,363,362 B1 | 3/2002 | Burfield et al. |
| 6,363,364 B1 | 3/2002 | Nel |
| 6,366,893 B2 | 4/2002 | Hannula et al. |
| 6,375,073 B1 | 4/2002 | Aebi et al. |
| 6,422,462 B1 | 7/2002 | Cohen |
| 6,424,706 B1 | 7/2002 | Katz et al. |
| 6,434,238 B1 | 8/2002 | Chaum et al. |
| 6,442,532 B1 | 8/2002 | Kawan |
| 6,467,684 B2 | 10/2002 | Fite et al. |
| 6,473,500 B1 | 10/2002 | Risafi et al. |
| 6,494,367 B1 | 12/2002 | Zacharias |
| 6,502,745 B1 | 1/2003 | Stimson et al. |
| 6,575,361 B1 | 6/2003 | Graves et al. |
| 6,581,827 B2 | 6/2003 | Welton |
| 6,591,098 B1 | 7/2003 | Shieh et al. |
| 6,594,640 B1 | 7/2003 | Postrel |
| 6,594,644 B1 * | 7/2003 | Van Dusen .................. 705/39 |
| 6,609,113 B1 | 8/2003 | O'Leary et al. |
| 6,615,189 B1 | 9/2003 | Phillips et al. |
| 6,615,190 B1 | 9/2003 | Slater |
| 6,622,015 B1 | 9/2003 | Himmel et al. |
| 6,648,222 B2 | 11/2003 | McDonald et al. |
| 6,651,885 B1 | 11/2003 | Arias |
| 6,659,259 B2 | 12/2003 | Knox et al. |
| 6,678,664 B1 | 1/2004 | Ganesan |
| 6,684,269 B2 | 1/2004 | Wagner |
| 6,705,520 B1 | 3/2004 | Pitroda et al. |
| 6,745,022 B2 | 6/2004 | Knox |
| 6,769,607 B1 | 8/2004 | Pitroda et al. |
| 6,805,289 B2 | 10/2004 | Noriega et al. |
| 6,807,410 B1 | 10/2004 | Pailles et al. |
| 6,819,219 B1 | 11/2004 | Bolle et al. |
| 6,827,260 B2 | 12/2004 | Stoutenburg et al. |
| 6,829,596 B1 * | 12/2004 | Frazee ........................ 705/66 |
| 6,834,796 B2 * | 12/2004 | Anvekar et al. ............ 235/380 |
| 6,836,765 B1 | 12/2004 | Sussman |
| 6,836,962 B2 | 1/2005 | Khandros et al. |
| 6,839,692 B2 | 1/2005 | Carrott et al. |
| 6,839,744 B1 | 1/2005 | Kloba et al. |
| 6,848,613 B2 | 2/2005 | Nielsen et al. |
| 6,856,974 B1 | 2/2005 | Ganesan et al. |
| 6,868,391 B1 | 3/2005 | Hultgren |
| 6,882,984 B1 | 4/2005 | Boyle et al. |
| 6,918,537 B2 * | 7/2005 | Graves et al. ............... 235/379 |
| 6,925,439 B1 | 8/2005 | Pitroda |
| 6,932,268 B1 | 8/2005 | McCoy et al. |
| 6,934,529 B2 | 8/2005 | Bagoren et al. |
| 6,934,689 B1 | 8/2005 | Ritter et al. |
| 6,941,270 B1 | 9/2005 | Hannula |
| 6,948,063 B1 | 9/2005 | Ganesan et al. |
| 6,961,412 B2 | 11/2005 | Ruckart et al. |
| 6,988,657 B1 | 1/2006 | Singer et al. |
| 7,014,107 B2 | 3/2006 | Singer et al. |
| 7,024,174 B2 | 4/2006 | Nagy et al. |
| 7,024,396 B2 | 4/2006 | Woodward |
| 7,054,842 B2 * | 5/2006 | James et al. ................. 705/64 |

(56) References Cited

U.S. PATENT DOCUMENTS

| | | | |
|---|---|---|---|
| 7,069,248 B2 | 6/2006 | Huber | |
| 7,072,854 B2 | 7/2006 | Loeser | |
| 7,072,864 B2 | 7/2006 | Brake, Jr. et al. | |
| 7,083,084 B2 * | 8/2006 | Graves et al. | 235/380 |
| 7,085,931 B1 | 8/2006 | Smith et al. | |
| 7,086,584 B2 * | 8/2006 | Stoutenburg et al. | 235/379 |
| 7,093,761 B2 | 8/2006 | Smith et al. | |
| 7,128,274 B2 | 10/2006 | Kelley et al. | |
| 7,130,817 B2 | 10/2006 | Karas et al. | |
| 7,131,582 B2 | 11/2006 | Welton | |
| 7,165,052 B2 | 1/2007 | Diveley et al. | |
| 7,182,252 B1 | 2/2007 | Cooper et al. | |
| 7,194,438 B2 | 3/2007 | Sovio et al. | |
| 7,209,889 B1 | 4/2007 | Whitfield | |
| 7,209,890 B1 | 4/2007 | Peon et al. | |
| 7,222,101 B2 | 5/2007 | Bishop et al. | |
| 7,229,006 B2 | 6/2007 | Babbi et al. | |
| 7,229,014 B1 | 6/2007 | Snyder | |
| 7,243,839 B2 | 7/2007 | Beck et al. | |
| 7,249,054 B2 | 7/2007 | Keil | |
| 7,249,097 B2 | 7/2007 | Hutchison et al. | |
| 7,269,256 B2 | 9/2007 | Rosen | |
| 7,292,998 B2 | 11/2007 | Graves et al. | |
| 7,316,350 B2 | 1/2008 | Algiene | |
| 7,328,190 B2 | 2/2008 | Smith et al. | |
| 7,333,955 B2 | 2/2008 | Graves et al. | |
| 7,356,327 B2 | 4/2008 | Cai et al. | |
| 7,363,265 B2 | 4/2008 | Horgan | |
| 7,370,012 B2 | 5/2008 | Karns et al. | |
| 7,376,431 B2 | 5/2008 | Niedemeyer | |
| 7,383,226 B2 | 6/2008 | Kight et al. | |
| 7,398,248 B2 | 7/2008 | Phillips et al. | |
| 7,437,328 B2 | 10/2008 | Graves et al. | |
| 7,478,143 B1 * | 1/2009 | Friedman et al. | 709/219 |
| 7,536,349 B1 | 5/2009 | Mik et al. | |
| 7,566,000 B2 | 7/2009 | Agostino et al. | |
| 7,650,308 B2 | 1/2010 | Nguyen et al. | |
| 7,668,619 B2 * | 2/2010 | Torian | 700/233 |
| 7,690,580 B2 | 4/2010 | Shoemaker | |
| 7,774,209 B2 * | 8/2010 | James et al. | 705/1.1 |
| 7,866,548 B2 | 1/2011 | Reed et al. | |
| 7,941,373 B1 | 5/2011 | Chang et al. | |
| 8,046,268 B2 | 10/2011 | Hunt | |
| 8,060,413 B2 | 11/2011 | Castell et al. | |
| 8,195,568 B2 | 6/2012 | Singhal | |
| 8,245,910 B2 * | 8/2012 | Sullivan et al. | 235/379 |
| 8,267,313 B2 * | 9/2012 | Harper et al. | 235/380 |
| 8,332,277 B2 * | 12/2012 | McCaffery et al. | 705/26.1 |
| 2001/0001321 A1 | 5/2001 | Resnick et al. | |
| 2001/0001856 A1 | 5/2001 | Gould et al. | |
| 2001/0005840 A1 | 6/2001 | Verkama | |
| 2001/0007983 A1 | 7/2001 | Lee | |
| 2001/0011248 A1 | 8/2001 | Himmel et al. | |
| 2001/0032878 A1 | 10/2001 | Tsiounis et al. | |
| 2001/0034707 A1 | 10/2001 | Sakaguchi | |
| 2001/0042784 A1 | 11/2001 | Fite et al. | |
| 2001/0042785 A1 | 11/2001 | Walker et al. | |
| 2001/0044776 A1 | 11/2001 | Kight et al. | |
| 2002/0002535 A1 | 1/2002 | Kitchen et al. | |
| 2002/0010677 A1 | 1/2002 | Kitchen et al. | |
| 2002/0013768 A1 | 1/2002 | Ganesan | |
| 2002/0019809 A1 | 2/2002 | Kitchen et al. | |
| 2002/0022472 A1 | 2/2002 | Watler et al. | |
| 2002/0046165 A1 | 4/2002 | Kitchen et al. | |
| 2002/0046166 A1 | 4/2002 | Kitchen et al. | |
| 2002/0046167 A1 | 4/2002 | Kitchen et al. | |
| 2002/0046168 A1 | 4/2002 | Kitchen et al. | |
| 2002/0049672 A1 | 4/2002 | Kitchen et al. | |
| 2002/0052840 A1 | 5/2002 | Kitchen et al. | |
| 2002/0052841 A1 | 5/2002 | Guthrie et al. | |
| 2002/0060243 A1 | 5/2002 | Janiak et al. | |
| 2002/0062282 A1 | 5/2002 | Kight et al. | |
| 2002/0065773 A1 | 5/2002 | Kight et al. | |
| 2002/0065774 A1 | 5/2002 | Young et al. | |
| 2002/0077076 A1 | 6/2002 | Suryanarayana et al. | |
| 2002/0077993 A1 | 6/2002 | Immonen et al. | |
| 2002/0095387 A1 | 7/2002 | Sosa et al. | |
| 2002/0101966 A1 | 8/2002 | Nelson | |
| 2002/0111906 A1 | 8/2002 | Garrison et al. | |
| 2002/0115424 A1 | 8/2002 | Bagoren et al. | |
| 2002/0116329 A1 | 8/2002 | Serbetcioglu et al. | |
| 2002/0119767 A1 | 8/2002 | Fieldhouse et al. | |
| 2002/0120571 A1 | 8/2002 | Maung et al. | |
| 2002/0128968 A1 | 9/2002 | Kitchen et al. | |
| 2002/0138450 A1 | 9/2002 | Kremer | |
| 2002/0152123 A1 | 10/2002 | Giordano et al. | |
| 2002/0152160 A1 | 10/2002 | Allen-Rouman et al. | |
| 2002/0152179 A1 | 10/2002 | Racov | |
| 2002/0153414 A1 | 10/2002 | Stoutenburg et al. | |
| 2002/0161631 A1 | 10/2002 | Banerjee et al. | |
| 2002/0169713 A1 | 11/2002 | Chang et al. | |
| 2002/0178062 A1 | 11/2002 | Wright et al. | |
| 2002/0190123 A1 | 12/2002 | Anvekar et al. | |
| 2003/0001055 A1 | 1/2003 | Harary et al. | |
| 2003/0004802 A1 | 1/2003 | Callegari | |
| 2003/0004891 A1 | 1/2003 | Van Rensburg et al. | |
| 2003/0023552 A1 | 1/2003 | Kight et al. | |
| 2003/0028481 A1 | 2/2003 | Flitcroft et al. | |
| 2003/0033246 A1 | 2/2003 | Slater | |
| 2003/0055735 A1 | 3/2003 | Cameron et al. | |
| 2003/0055782 A1 | 3/2003 | Slater | |
| 2003/0070080 A1 | 4/2003 | Rosen | |
| 2003/0074328 A1 | 4/2003 | Schiff et al. | |
| 2003/0080186 A1 * | 5/2003 | McDonald et al. | 235/380 |
| 2003/0105672 A1 | 6/2003 | Epstein et al. | |
| 2003/0115126 A1 | 6/2003 | Pitroda | |
| 2003/0162565 A1 | 8/2003 | Al-Khaja | |
| 2003/0191711 A1 | 10/2003 | Jamison et al. | |
| 2003/0200179 A1 | 10/2003 | Kwan | |
| 2003/0200184 A1 | 10/2003 | Dominguez et al. | |
| 2003/0212601 A1 | 11/2003 | Silva et al. | |
| 2003/0218062 A1 | 11/2003 | Noriega et al. | |
| 2003/0218066 A1 | 11/2003 | Fernandes et al. | |
| 2003/0220884 A1 | 11/2003 | Choi et al. | |
| 2003/0226042 A1 | 12/2003 | Fukushima | |
| 2003/0229590 A1 | 12/2003 | Byrne et al. | |
| 2003/0233317 A1 | 12/2003 | Judd | |
| 2003/0233318 A1 | 12/2003 | King et al. | |
| 2003/0236704 A1 | 12/2003 | Antonucci | |
| 2004/0009760 A1 | 1/2004 | Laybourn et al. | |
| 2004/0010462 A1 | 1/2004 | Moon et al. | |
| 2004/0019564 A1 | 1/2004 | Goldthwaite et al. | |
| 2004/0019568 A1 | 1/2004 | Moenickheim et al. | |
| 2004/0029569 A1 | 2/2004 | Khan et al. | |
| 2004/0046035 A1 | 3/2004 | Davila et al. | |
| 2004/0049456 A1 | 3/2004 | Dreyer | |
| 2004/0049458 A1 | 3/2004 | Kunugi et al. | |
| 2004/0054587 A1 | 3/2004 | Dev et al. | |
| 2004/0059671 A1 | 3/2004 | Nozaki et al. | |
| 2004/0064409 A1 | 4/2004 | Kight et al. | |
| 2004/0068446 A1 | 4/2004 | Do et al. | |
| 2004/0068448 A1 | 4/2004 | Kim | |
| 2004/0078327 A1 | 4/2004 | Frazier et al. | |
| 2004/0078332 A1 | 4/2004 | Ferguson et al. | |
| 2004/0083170 A1 | 4/2004 | Bam et al. | |
| 2004/0083171 A1 | 4/2004 | Kight et al. | |
| 2004/0093281 A1 * | 5/2004 | Silverstein et al. | 705/26 |
| 2004/0093305 A1 | 5/2004 | Kight et al. | |
| 2004/0094624 A1 | 5/2004 | Fernandes et al. | |
| 2004/0107170 A1 | 6/2004 | Labrou et al. | |
| 2004/0114766 A1 | 6/2004 | Hileman et al. | |
| 2004/0117302 A1 | 6/2004 | Weichert et al. | |
| 2004/0118914 A1 * | 6/2004 | Smith et al. | 235/380 |
| 2004/0128197 A1 | 7/2004 | Bam et al. | |
| 2004/0139005 A1 | 7/2004 | Ganesan | |
| 2004/0159700 A1 | 8/2004 | Khan et al. | |
| 2004/0162058 A1 | 8/2004 | Mottes | |
| 2004/0167853 A1 | 8/2004 | Sharma | |
| 2004/0181463 A1 | 9/2004 | Goldthwaite et al. | |
| 2004/0195316 A1 * | 10/2004 | Graves et al. | 235/380 |
| 2004/0199431 A1 | 10/2004 | Ganesan et al. | |
| 2004/0199474 A1 | 10/2004 | Ritter | |
| 2004/0205023 A1 | 10/2004 | Hafer et al. | |
| 2004/0215560 A1 | 10/2004 | Amalraj et al. | |

(56) References Cited

U.S. PATENT DOCUMENTS

| | | |
|---|---|---|
| 2004/0215564 A1 | 10/2004 | Lawlor et al. |
| 2004/0215573 A1 | 10/2004 | Teutenberg et al. |
| 2004/0230489 A1 | 11/2004 | Goldthwaite et al. |
| 2004/0242208 A1 | 12/2004 | Teicher |
| 2004/0243490 A1 | 12/2004 | Murto et al. |
| 2004/0249766 A1 | 12/2004 | Ganesan et al. |
| 2004/0267663 A1 | 12/2004 | Karns et al. |
| 2004/0267664 A1 | 12/2004 | Nam et al. |
| 2004/0267665 A1 | 12/2004 | Nam et al. |
| 2005/0001027 A1 | 1/2005 | Bahar |
| 2005/0015388 A1 | 1/2005 | Dasgupta et al. |
| 2005/0027655 A1 | 2/2005 | Sharma et al. |
| 2005/0033645 A1 | 2/2005 | Duphily |
| 2005/0051619 A1* | 3/2005 | Graves et al. .............. 235/380 |
| 2005/0060261 A1 | 3/2005 | Remington et al. |
| 2005/0061872 A1 | 3/2005 | Paschini et al. |
| 2005/0065876 A1 | 3/2005 | Kumar |
| 2005/0071179 A1 | 3/2005 | Peters et al. |
| 2005/0071269 A1 | 3/2005 | Peters |
| 2005/0075958 A1 | 4/2005 | Gonzalez |
| 2005/0075975 A1 | 4/2005 | Rosner et al. |
| 2005/0079863 A1 | 4/2005 | Macaluso |
| 2005/0080634 A1 | 4/2005 | Kanniainen et al. |
| 2005/0086164 A1 | 4/2005 | Kim et al. |
| 2005/0097038 A1 | 5/2005 | Yu et al. |
| 2005/0103839 A1 | 5/2005 | Hewel |
| 2005/0107068 A1 | 5/2005 | Smith et al. |
| 2005/0108121 A1* | 5/2005 | Gravett et al. .............. 705/35 |
| 2005/0109835 A1 | 5/2005 | Jacoby et al. |
| 2005/0125343 A1 | 6/2005 | Mendelovich |
| 2005/0125348 A1 | 6/2005 | Fulton et al. |
| 2005/0127169 A1 | 6/2005 | Foss |
| 2005/0137978 A1 | 6/2005 | Ganesan et al. |
| 2005/0143051 A1 | 6/2005 | Park |
| 2005/0174975 A1 | 8/2005 | Mgrdechian et al. |
| 2005/0177437 A1 | 8/2005 | Ferrier |
| 2005/0182714 A1 | 8/2005 | Nel |
| 2005/0182720 A1 | 8/2005 | Willard et al. |
| 2005/0184145 A1 | 8/2005 | Law et al. |
| 2005/0187873 A1 | 8/2005 | Labrou et al. |
| 2005/0197919 A1* | 9/2005 | Robertson .............. 705/26 |
| 2005/0203835 A1 | 9/2005 | Nhaissi et al. |
| 2005/0203844 A1 | 9/2005 | Ferguson et al. |
| 2005/0209965 A1 | 9/2005 | Ganesan |
| 2005/0222925 A1 | 10/2005 | Jamieson |
| 2005/0222961 A1 | 10/2005 | Staib et al. |
| 2005/0247777 A1 | 11/2005 | Pitroda |
| 2005/0259589 A1 | 11/2005 | Rozmovits et al. |
| 2005/0261968 A1 | 11/2005 | Randall et al. |
| 2005/0262017 A1 | 11/2005 | Kawase et al. |
| 2005/0269401 A1 | 12/2005 | Spitzer et al. |
| 2005/0269402 A1 | 12/2005 | Spitzer et al. |
| 2005/0274793 A1 | 12/2005 | Cantini et al. |
| 2006/0000900 A1 | 1/2006 | Fernandes et al. |
| 2006/0004656 A1 | 1/2006 | Lee |
| 2006/0006226 A1 | 1/2006 | Fitzgerald et al. |
| 2006/0023856 A1 | 2/2006 | Welton |
| 2006/0026070 A1 | 2/2006 | Sun |
| 2006/0058011 A1 | 3/2006 | Vanska et al. |
| 2006/0074767 A1 | 4/2006 | Fortney et al. |
| 2006/0080232 A1 | 4/2006 | Epps |
| 2006/0085310 A1 | 4/2006 | Mylet et al. |
| 2006/0089893 A1 | 4/2006 | Joseph et al. |
| 2006/0113376 A1 | 6/2006 | Reed et al. |
| 2006/0116892 A1 | 6/2006 | Grimes et al. |
| 2006/0136334 A1 | 6/2006 | Atkinson et al. |
| 2006/0136901 A1 | 6/2006 | Nichols |
| 2006/0161490 A1 | 7/2006 | Chakiris et al. |
| 2006/0163343 A1 | 7/2006 | Changryeol |
| 2006/0206436 A1* | 9/2006 | James et al. .............. 705/65 |
| 2006/0207856 A1 | 9/2006 | Dean et al. |
| 2006/0218038 A1* | 9/2006 | Grider .............. 705/14 |
| 2006/0235754 A1 | 10/2006 | Walker et al. |
| 2007/0017976 A1 | 1/2007 | Peyret et al. |
| 2007/0055785 A1 | 3/2007 | Stevens |
| 2007/0063024 A1 | 3/2007 | Guillot |
| 2007/0108269 A1 | 5/2007 | Benco et al. |
| 2007/0118478 A1 | 5/2007 | Graves et al. |
| 2007/0130085 A1 | 6/2007 | Zhu |
| 2007/0162337 A1 | 7/2007 | Hawkins et al. |
| 2007/0175984 A1* | 8/2007 | Khandaker et al. .......... 235/380 |
| 2007/0187492 A1* | 8/2007 | Graves et al. ............... 235/380 |
| 2007/0210152 A1* | 9/2007 | Read ............................ 235/380 |
| 2007/0233615 A1 | 10/2007 | Tumminaro |
| 2007/0272743 A1* | 11/2007 | Christie et al. ............... 235/381 |
| 2007/0278296 A1* | 12/2007 | Dwyre et al. ................. 235/380 |
| 2007/0284434 A1 | 12/2007 | Fletcher |
| 2008/0006685 A1 | 1/2008 | Rackley, III et al. |
| 2008/0010190 A1 | 1/2008 | Rackley, III et al. |
| 2008/0010191 A1 | 1/2008 | Rackley, III et al. |
| 2008/0010192 A1 | 1/2008 | Rackley, III et al. |
| 2008/0010193 A1 | 1/2008 | Rackley, III et al. |
| 2008/0010196 A1 | 1/2008 | Rackley, III et al. |
| 2008/0010204 A1 | 1/2008 | Rackley, III et al. |
| 2008/0010215 A1 | 1/2008 | Rackley, III et al. |
| 2008/0033817 A1 | 2/2008 | Billmaier et al. |
| 2008/0040265 A1 | 2/2008 | Rackley, III et al. |
| 2008/0041938 A1* | 2/2008 | Wise ............................ 235/380 |
| 2008/0046366 A1 | 2/2008 | Bemmel et al. |
| 2008/0052164 A1 | 2/2008 | Abifaker |
| 2008/0071620 A1 | 3/2008 | Lowe |
| 2008/0091545 A1 | 4/2008 | Jennings, Jr. et al. |
| 2008/0097844 A1* | 4/2008 | Hsu et al. ...................... 705/14 |
| 2008/0103972 A1 | 5/2008 | Lanc |
| 2008/0114699 A1 | 5/2008 | Yuan et al. |
| 2008/0126145 A1 | 5/2008 | Rackley, III et al. |
| 2008/0172306 A1* | 7/2008 | Schorr et al. .................. 705/26 |
| 2008/0172331 A1* | 7/2008 | Graves et al. .................. 705/41 |
| 2009/0001159 A1* | 1/2009 | James et al. ................... 235/379 |
| 2009/0055296 A1* | 2/2009 | Nelsen .......................... 705/30 |
| 2009/0157554 A1 | 6/2009 | Hobson et al. |
| 2009/0192928 A1 | 7/2009 | Abifaker |
| 2009/0254432 A1* | 10/2009 | McCaffery et al. ......... 705/14.34 |
| 2009/0298421 A1 | 12/2009 | Wilkinson et al. |
| 2010/0005025 A1 | 1/2010 | Kumar et al. |
| 2010/0063906 A1 | 3/2010 | Nelsen et al. |
| 2010/0076833 A1 | 3/2010 | Nelsen |
| 2010/0082487 A1 | 4/2010 | Nelsen |
| 2010/0130172 A1 | 5/2010 | Vendrow et al. |
| 2010/0312636 A1* | 12/2010 | Coulter et al. .............. 705/14.38 |
| 2011/0060904 A9* | 3/2011 | Whitfield .................... 713/156 |
| 2011/0068168 A1* | 3/2011 | Graves et al. ................. 235/379 |
| 2011/0071913 A1* | 3/2011 | Chakiris et al. .............. 705/17 |
| 2011/0082772 A1 | 4/2011 | Hirson |
| 2011/0087592 A1 | 4/2011 | Van Der et al. |
| 2011/0106698 A1 | 5/2011 | Isaacson et al. |
| 2011/0145044 A1 | 6/2011 | Nelsen et al. |
| 2011/0173083 A1 | 7/2011 | Reed et al. |
| 2011/0282784 A1 | 11/2011 | Nelsen |
| 2011/0307377 A1 | 12/2011 | Nelsen et al. |

FOREIGN PATENT DOCUMENTS

| | | |
|---|---|---|
| JP | 2002318951 | 10/2002 |
| KR | 20010106187 A | 11/2001 |
| KR | 1020010106187 A | 11/2001 |
| KR | 20040028487 | 4/2004 |
| KR | 20040028487 A | 4/2004 |
| KR | 20040052531 A | 6/2004 |
| KR | 1020040052502 | 6/2004 |
| KR | 20040069294 | 8/2004 |
| KR | 20050118609 A | 12/2005 |
| KR | 20090123444 A | 12/2009 |
| WO | 2004012118 A1 | 2/2004 |
| WO | 2005111882 A1 | 11/2005 |
| WO | 2008005018 A | 1/2008 |

OTHER PUBLICATIONS

Nelson, David A., "Systems and Methods for Fixed Form Card to Virtual Card Communication," U.S. Appl. No. 13/525,062, filed Jun. 15, 2012, 62 pages.

(56) References Cited

OTHER PUBLICATIONS

ISA Korea, International Search Report of PCT/US2009/056118, Apr. 19, 2010, 3 pages.
ISA Korea, International Search Report of PCT/US2009/058111, May 26, 2010, 3 pages.
ISA European Patent Office, Extended European Search Report of PCT/US2009/056118, Jul. 4, 2012, Germany, 11 pages.
ISA Korean Intellectual Property Office, International Search Report of PCT/US2010/060875, Jul. 29, 2011, 10 pages.
ISA United States, International Search Report of PCT/US2008/073910, Nov. 10, 2008.

* cited by examiner

SYSTEMS AND METHODS FOR ELECTRONIC DELIVERY OF STORED VALUE

CROSS REFERENCE TO RELATED APPLICATION

The present application claims the benefit of and priority to U.S. Provisional Patent Application No. 60/966,034, filed on Aug. 23, 2007, entitled SYSTEMS AND METHODS FOR ELECTRONIC DELIVERY OF STORED VALUE, the content of which is incorporated herein by reference for all purposes.

FIELD

The present disclosure relates generally to systems and methods for electronic delivery of stored value, and more particularly to systems and methods for managing, tracking and authenticating electronically-issued value cards.

BACKGROUND AND SUMMARY

The use of merchant value cards (such as gift cards and gift certificates) by consumers has become popular. Traditionally-issued value cards, such as a merchant issued plastic gift card, may be available at the merchant's brick and mortar store, however alternative purchasing options have developed. For example, some businesses now offer an online service where a user may optionally purchase a value card from a merchant's website and then redeem or present the value card for redemption at the merchant's location. However, different value card programs may require a merchant to use different custom software programs or services in order to accommodate different value card offerings. For example, a value card offered by one gift card company may not be compatible with a merchant's software program for processing gift cards offered by a different gift card company. Further, value cards purchased online may not be compatible with the existing merchant's point-of-sale (POS) software programs for handling non-electronically delivered value cards. The merchant's existing POS software programs may offer limited functionality with a gift card service provider, such as an online gift card service provider. The lack of cross compatibility between different value card services may increase the processing required to account and authenticate the value cards and may increase the overall resources necessary to offer online value card services.

As an example, the inventors herein have recognized that difficulties arise when processing and authenticating the online value cards, when a purchaser attempts to redeem the value card using a merchant's current POS system and/or gift tracking services. Difficulties also arise when purchasing an online value card and then attempting to use the card for online goods and services. Typically, with current online value card services, the merchant must login to, or otherwise authenticate the validity of an online value card using, a third party system that manages and tracks the value cards, such as the gift card system of a gift card company that offers the gift card. However, logging on to a third party system may result in a slow transaction processing time, which may be undesirable, particularly in a store such as a busy restaurant where there may be a high volume of low dollar value cards certificates introduced. In such prior systems, each merchant must separately develop an online program to interact with its specific type of POS system or use the third party system. Such customization is expensive and inefficient and merchants may find themselves attempting to run different types of accounting systems and programs to accommodate the online value card offerings along side their normal retail-issued valued card services. As a result, current systems force merchants to either expend significant resources to offer online value card services or forego (or limit) the offering of such value card services.

As disclosed herein, the inventors have developed systems and methods which address the above issues and provide electronic delivery and management of stored value cards. As described in detail below, systems and methods are provided which enable merchants to easily offer and track issuance and redemption of online stored value by creating systems that allow merchants the ability to easily utilize their existing stored value methodologies in the online arena. Further, the inventors have identified systems and methods enable immediate recognition and authentication of a presented value card (regardless of online purchase of the value card) into the merchant's current POS system and/or gift card tracking systems. For example, in some embodiments, merchants will be able to scan the UPC of an electronically-issued certificate, or input the unique ID of that certificate into their current POS system or Stored Value Tracking Service and have the certificate recognized and tracked with traditionally issued certificates or cards (e.g. plastic). The methods and systems herein reduce fraudulent attempted uses of electronically delivered certificates and enable a merchant to efficiently and cost effectively offer an online stored value service regardless of the merchant's current POS system.

Thus, systems and methods for managing electronically delivered value cards are provided. An example method includes receiving a set of identifiers corresponding to a merchant's stored value tracking system, receiving a request for an electronic value card, associating an identifier from the set of identifiers with the electronic value card, synchronizing the merchant's stored value tracking system with the issued electronic value card, and delivering the electronic value card to a customer. An example system includes a merchant stored value tracking system having a set of unique identifiers, a network communicatively linked with a merchant stored value tracking system; and a value card manager communicatively linked with the network. The value card manager may be configured to receive a request for an electronic value card, synchronize the electronic value card with the merchant stored value tracking system using the unique identifiers, and deliver the electronic value card to a customer for use in the merchant stored value tracking system.

As a further example, the value card manager may be configured to electronically issue value cards that are assigned redeemable value, where the value card manager synchronizes the issuance of each of the value cards with one or more merchant's stored value tracking systems. In some embodiments, the electronically delivered value card may be authenticated and processed for redemption by any one of merchant's stored value tracking systems without the merchant's stored value tracking system having to have real time communication with a secondary or external value card tracking system (system outside of the merchant's stored value tracking system). As such, the systems and methods herein provided provide a platform for integrating the value card market, allowing a merchant's store, whether it is an online store or a local store, the ability to accept and process value cards offered by various vendors using their existing merchant's stored value tracking systems regardless of the type of value card used.

BRIEF DESCRIPTION OF THE FIGURES

The disclosure is illustrated by way of example and not by way of limitation in the figures of the accompanying drawings, in which the like references indicate similar elements and in which.

DETAILED DESCRIPTION

Figure 1:
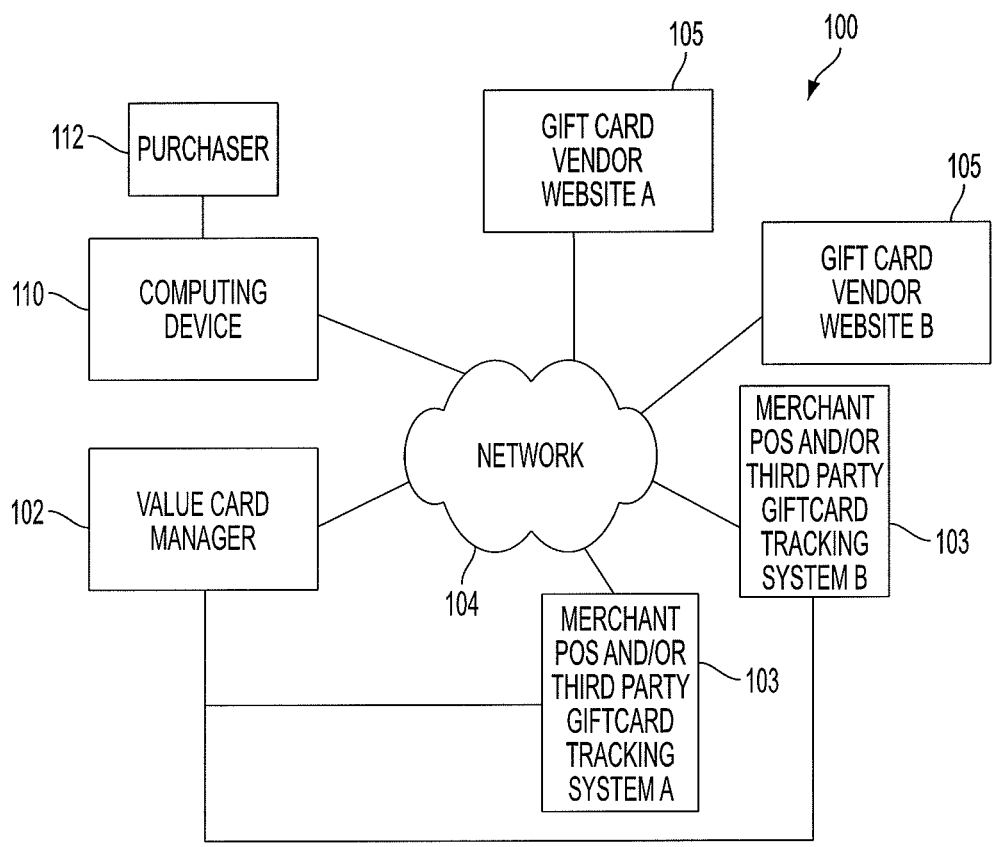
FIG. 1 is a schematic illustration of a system for managing, including for example issuing, delivering, authenticating and/or tracking, electronically delivered value cards according to an embodiment of the present disclosure.

FIG. 1 shows a schematic illustration of a system, such as a computerized system, for managing, including, for example, issuing, delivering, tracking and/or authenticating, electronically delivered value cards according to an embodiment of the present disclosure. Such system is also referred to herein as a value card management system in the present application. As described in more detail below, a value card manager may enable electronic delivery of a value card to a customer and may enable use of the value card with a merchant's stored value tracking service system, such as one or both of a merchant's customary point-of-sale (POS) system and/or third party stored value tracking system. The value cards managed by the value card manager may be compatible with multiple merchant's stored value tracking systems of different types that are not directly compatible with each other.

It should be appreciated that value cards, as used herein, may be any physically-issued or electronically-issued certificate, gift card, gift certificate, loyalty card, prepaid card, store value card, or other redeemable value issued statement. As such the value cards may be assigned value that can be redeemed for goods and/or services from one or more merchant's, such as a merchant's local store or a merchant's online store.

It should be further appreciated that electronically-issued or electronic delivery of value card includes delivery of the value card through an electronic method using any suitable electronic systems and networks. The electronically delivered value card does not have to be shipped or otherwise physically presented to the purchaser of the card. Instead, an electronically issued card may enable a purchaser (or recipient of the purchaser) to print or otherwise present the value card to a merchant store either through physical presentation of the value card or through the use of an electronic device. For example the electronically delivered value card may be delivered via an email to a customer's computer, handheld device, mobile device, etc. and may be presented electronically. The electronically issued value card may enable a customer or a recipient to electronically present the value card to the merchant, either an on-line merchant or the brick and mortar merchant. As described in more detail below, the electronically delivered value card may be verified and processed by the merchant's stored value tracking system.

As shown in FIG. 1, a system for electronic delivery of stored value is illustrated schematically at 100. As illustrated, the system 100 may include a value card manager 102 which is configured to manage, including for example issuing, delivering, tracking, and/or authenticating issuance of value cards. The value card manager 102 may be configured to execute computer-executable instructions or code, such as programs, stored on and executed by one or more computing devices. It should be appreciated that computing device or computer, as used herein, includes devices that electronically execute one or more programs, including but not limited to personal computers, servers, laptop computers, hand-held devices, cellular phones and other micro-processor-based programmable consumer electronics and/or appliances, routers, gateways, hubs and other computer networking devices, etc.

Value card manager 102, also referred to in this example, as ECD (electronic card/certificate delivery) value card manager, 102 may include one or more value card issuance and delivery programs, one or more merchant number databases, one or more value assignment programs, and/or one or more tracking and management programs. Generally, programs may include routines, objects, components, data structures, and the like that perform particular tasks or implement particular abstract data types. Programs may connote a single program or multiple programs acting in concert, and may be used to denote both applications and services.

The ECD value card manager 102 may be linked with one or more merchant's stored value tracking systems or services 103, such as one or more merchant POS systems, and/or one or more third party gift card tracking systems. As shown, the ECD value card manager 102 may be linked through network 104 to the merchant's stored value tracking system 103, including for example merchant POS system and/or third party gift card tracking system A, and merchant POS system and/or third party gift card tracking system B. The ECD value card manager may issue and deliver the electronic value card on behalf of the merchant stored value tracking system.

It should be appreciated that network 104 may communicatively link one or more computing devices together. As an example, network 104 may include various interconnected networking devices, such as routers, gateways, hubs, etc. which transport communications between computing devices. Furthermore, connections over network 104 may be a wireless, wired, or another type of network connection. Network 104 may be a remote network, a private network, a public network, wide area network or combination thereof. For example, network 104 may include a public network, such as the Internet.

Further linked to network 104 may be one or more value card customer computing devices 110. A customer 112 may access and obtain, for example by purchasing through a merchant's web page, a gift card company's web page, an electronically delivered value card using the computing device 110 linked to network 104. Although the web pages or the access points to the electronically issued value cards are not illustrated in FIG. 1, it should be appreciated that any suitable system may be used to enable a customer to select and acquire a value card through the network 104.

The ECD value card manager 102 may manage, such as issue, deliver, track and/or authenticate issuance of, the value cards on behalf a merchant or a third party value card sponsor 105 that sponsors the value cards. Thus, the network 104 may also be linked to one or more value card vendor websites 105 through which the ECD value card manager 102 issues value cards. Such websites 105 may, for example, be a merchant's own websites for selling or otherwise issuing the value cards, or a third party website, such as a wholesale value card provider site that issues the value cards on behalf of a merchant. As shown, the network 104 may be linked to value card vendor website A and value card vendor website B.

A customer may select issuance of a value card and the value card may be issued and delivered electronically to the customer, or to another designated customer, via any suitable application. It should be appreciated that as used herein, application refers to software or firmware components that may be executed by, or utilized by one or more computing devices, and is meant to encompass executable files, data files, libraries, drivers, scripts, database records, etc. For example, the value card may be delivered to a customer via a communication application, such as through email or other message system, where the communication sent to the customer may include a locator, such as a secure URL link, that when entered into a browser, for example by clicking on it, will present the electronically delivered value card to the customer. Alternatively, the value card may be directly delivered to a customer's computing device, handheld device, mobile device, computer, etc. via email or other electronic communication system or network.

As described in more detail below, the ECD value card manager 102 may synchronize, either through a manual or automated fashion, the electronically-issued value cards with individual merchant's stored value tracking systems 103, so that the customer may redeem or otherwise use the electronically delivered value cards at a merchant's local store or online store even when the merchant's stored value tracking system used by the merchant's local or online store is not in real time communication with the ECD value card manager 102 or a gift card program or system on behalf which the ECD value card manager 102 issues the value cards. The ECD value card manager ensures that the card is assigned value and operates within the merchant's system. The electronically issued value card may be processed (redeemed) in the same manner as purchased-on-location certificates or gift cards. In other words, the customer may redeem or otherwise use the electronically delivered value cards without the merchant's stored value tracking system 103 having to dial up a third party system, such as a third party gift card system or the ECD value card manager 102, at the time of purchase. The information necessary for authenticating and processing the value cards may already be present in the merchant's stored value tracking system 103 prior to the purchase or may be readily accessed and input into the merchant's stored value tracking system. In such ways, the transaction processing at the time of purchase may be sped up.

In some embodiments, the synchronization may be carried out by setting or integrating individual merchant's gift card tracking systems (or the third party gift card tracking services) for the merchant's multiple stored value tracking systems into the ECD value card manager. This may ensure that the electronically issued or delivered value cards issued by the ECD value card manager will be able to be processed and authenticated by each of the multiple merchant's stored value tracking systems. It should be appreciated that the system and methods described herein can thus be employed in a horizontal fashion across numerous different types of POS systems and/or third party gift card service tracking systems.

As an example, the ECD value card manager 102 may be loaded with a range of viable numbers, either sequential or non-sequential, that a merchant's stored value tracking system may recognize utilizing for example a bar code and/or unique numbering scheme, and which could be represented on the value cards as a magnetic stripe. This pool of numbers may be selected for assigning to or other for use with a newly issued value card in a random or ordered sequence manner. As another example, a list of viable numbers without order or sequence may be placed into the ECD value card manager 102 whereby the value card manger 102 pulls from that pool of possible numbers which would work with the merchant's stored value tracking system.

In some embodiments, individual merchant's stored value tracking systems 103 may be uploaded with information necessary for processing and authenticating the value cards issued by the ECD value card manager 102 prior to presentation of the value cards by the customer to the merchant's stored value tracking systems 103. Such information may for example include the unique identifiers and/or one or more tracking numbers for identifying or tracking the value cards issued and delivered by the value card manger 120. Such information may also include value assigned to each of the value cards issued by the ECD value card manager 102. The ECD value card manager 102 may schedule such upload manually or automatically, on demand or periodically (e.g., daily and hourly).

The electronically delivered value card may then be presented to a merchant in various suitable ways. For example, a customer may print out the electronically delivered value card and present a copy of the value card to merchant's local store to be redeemed. The customer may also electronically present the value card to a merchant's local store by for example showing images or information contained in the customer's mobile computing device such as mobile phone. A customer may also present the electronically delivered value card to a merchant's online store, for example by entering a unique identifier assigned or associated with the electronically delivered value card onto the merchant's online store.

When the electronically delivered value card is presented, a merchant's stored value tracking system 103 may be able to process and validate the value card presented, using information that are uploaded to the merchant's stored value tracking system 103 by the ECD value card manager 102 prior to the purchase. In other words the merchant's stored value tracking system 103 may be able to process the value card presented without having to dial up to the ECD value card manager 102 or a third party gift card system at the time of purchase. In this way, the processing of the value cards by the merchant's stored value tracking system may be sped up at the time of purchase.

As described above, the ECD value card manager 102 may ensure that the value card is assigned value. In some embodiments, the ECD value card manager 102 may temporarily hold the value of the electronic value card until value can be passed to the merchant's stored value tracking system or service 103 utilized by the merchant. For example, value may be held in systems where there is no real-time connection to the POS or third party card system or service. Sometimes these services may periodically check, either through an automated process or through a manual request, the ECD value card manager 102 to synchronize the issuance of value cards.

In some embodiments, after the value has been passed to the merchant's stored value tracking system, the ECD value card manager 102 may electronically fulfill the tangible evidence of that value card on behalf of the merchant's stored value tracking system or service 103. The value card may be retained in the ECD value card manager 102, such as within an associated database of the ECD value card manager 102, with the value card's last known value until a manual or automated lock-out process that updates the stored value of the value card, or tells the ECD value card manager 102 to no longer allow the value card to be accessed or viewed.

As an example, a manual lock-out process may include logging into an administrative area and changing or removing the value associated to that electronically delivered value card, inactivating the card, or simply declaring the value card and its stored value as void. An automated process may be employed between a merchant's stored value tracking system or service 103 and the ECD value card manager 102 to lock out the electronically delivered value card. For example, when a value card such as a gift certificate is used when the customer makes a purchase, the merchant's stored value tracking system or service 103 may automatically update the ECD value card manager 102 with the dollar amount used or available on the value card after the purchase.

In some embodiments, a security code may be added to the value cards delivered by the ECD value card manager 102. This code may for example include any number of characters and/or numbers that cross reference the unique number which represents the value card. For example, the security code may be added to the tracking numbers which were loaded from the viable numbers provided from the merchant's POS system. The security code may be randomly generated by the ECD value card manager 102 and delivered to the merchant's stored value tracking system 103, or it may be pre-associated with the unique number identifier that represents or is assigned to the value card. The code may be used to enhance secure delivery of the value card in an electronic fashion. In one example, duplicate communications may be used to ensure the security of the value card issued. For example, a first email communication may be sent with the value for unlocking the display of the value card. In some embodiments, this security code may be used within the merchant's stored value tracking system as a further cross reference to verify the authenticity of the electronically delivered value card.

Figure 2:
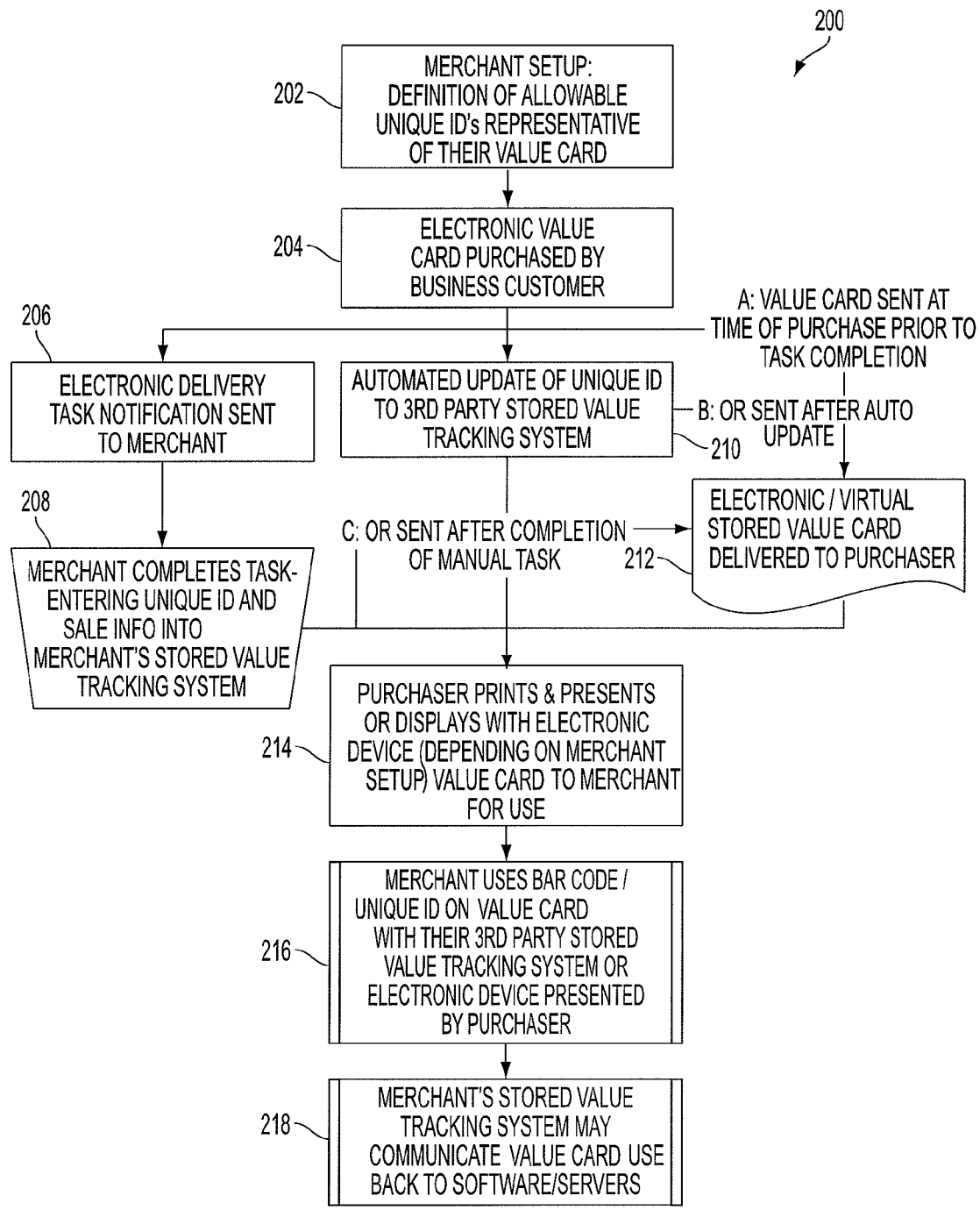
FIG. 2 shows an embodiment of a process flow of a method for managing, including, for example, issuing, delivering, tracking and/or authenticating, electronically delivered value cards according to an embodiment of the present disclosure.

Referring now to FIG. 2, which is a process flow of an example method 200 for managing, including for example issuing, delivering, authenticating and/or tracking, electronically delivered value cards provided according to an embodiment of the present disclosure. The method 200 may be implemented in the system 100 of FIG. 1. The process flow, and other methods described herein, may be executable, for example, via computer-executable instructions or code, such as programs, stored on and executed by a computing device. It should be noted that the process disclosed in FIG. 2 is an exemplary process and is not intended to be limiting in any sense.

As shown in FIG. 2, a merchant may be set up, as indicated at step 102, to enable an ECD value card manager (e.g., 102) to manage, including for example issuing, delivering, tracking and/or authenticating, electronically delivered value cards according to an embodiment of the present disclosure. As an example, prior to the issuance of any electronically delivered value cards by the ECD value card manager, a back-end administration system may upload the ECD value card manager with a designated group of identifiers. The defining of the identifiers provides the association keys that enable authentication and processing of the electronically delivered value cards. These identifiers may, for example, be unique numbers, bar code identifications, magnetic stripe identifications, etc. that may be assigned to a value card.

In some embodiments, the identifiers may be established by identifying a range of valid value card numbers and/or codes that are associated with those numbers. The numbers may be identified in such a way that they will be compatible or otherwise work with the existing merchant's stored value tracking system. Different merchant's stored value tracking systems or services may require different groups of identifiers, each group of identifiers being compatible with a different merchant's stored value tracking system.

The merchant may then display or provide access to potential customers of electronically delivered value cards. For example, a merchant may display or provide the value cards through a merchant website, a third party website, etc.

At step 204, a customer may purchase a value card, for example through the merchant website or the third party website. The value card may then be issued from the merchant website or the third party website by an ECD value card manager linked to the merchant website or the third party website. The issuance of the value card may be synchronized with a group of one or more merchant's stored value tracking systems or services (e.g., one or more of merchant's existing POS systems, and/or one or more third party gift card systems or programs), so that the value card may be redeemed at purchase utilizing any one of merchant's stored value tracking systems without the merchant' stored value tracking system having to have a real time communication with a third party system such as the ECD value card manager or a third party gift card system. As an example of synchronization, a manual or automatic task may be created for each one of the group of merchant's stored value tracking systems to update the merchant's stored value tracking system or service with the unique number or bar code that will identify that sale or issuance of the value card.

At 212, the value card may be electronically delivered to the customer, via for example an email message containing the value card. The delivery may be immediate upon purchase, or after completion of a manual merchant task in a manual merchant-task setup, or after an automatic merchant task in an automatic merchant-task setup.

As such, in a manual merchant-task setup, at 206, an electronic delivery task notification may be sent to a merchant from the ECD value card manager to notify the merchant that a value card has been electronically delivered to a customer. The task may require the merchant to enter the identifier identifying the value card, and/or to enter sales information regarding the sale or otherwise issuance of the value card into their merchant's stored value tracking system.

As described above, the identifier may be taken from the designated group of unique numbers or bar codes that were entered into the backend ECD value card manager during setup. Notification of this task may happen via email, telephone, fax or any other notification system so that the merchant is aware of the necessity to complete the task.

The merchant may complete the merchant task at 208. The merchant may complete the merchant task by entering the unique identifier and/or sales information into their merchant's stored value tracking system at 208. For example, the merchant may add the identifier (such as a unique ID, barcode ID, magnetic stripe ID) to their merchant's stored value tracking system along with the amount that the value card is valid for, a potential cross-reference code identification for the value card, along with other pertinent sales related information they deem relevant to the sale (customer name, recipient name, address information, phone information, date of purchase, expiration date, reason for purchase, custom message, etc). Entry of such data can be accomplished using a barcode scanning device for the sold value card if the stored value tracking service software supports this method. Alternatively, the task can be completed by inputting the data manually into the merchant's stored value tracking service by whatever method that the task is delivered by the ECD value card manager. For example, the task may be delivered through an online or networked administration area, fax, telephone call, or any other notification method.

In some systems, the system may enable automatic task completion, e.g. an automatic update of the merchant's stored value tracking service software, as indicated at 210. For example, the system may automatically update the stored value tracking service software utilizing an API (Application Programmatic Interface) to communicate the card information and value to the merchant's stored value tracking service software. This automation may improve the speed of the merchant in completing such a task after a successful sale.

It is noted that in some embodiments, a fraud screen system be provided as well as fraud flags. As an example, a fraud screen system may enable a merchant to review transaction information and request additional contact with the customer prior to completion of the assigning value to the requested value card and adding the value card to the merchant's stored value tracking system. Further, depending on whether a specific transaction is indicated as a potentially fraudulent transaction, automatic updates may be suspended or limited to only a specific type of transaction or customer.

In some embodiments, where delivery of the value card did not occur upon purchase, completion of merchant task (either automatically or manually) may result in a notification communication being sent to the customer. For example, upon completion of the merchant task, an email or other notification message may be generated and sent to the value card customer with a URL link for the customer to open the value card in a browser or other suitable window or display. In some embodiments, the notification communication may be sent immediately upon purchase of the value card. Interventions may be provided to limit access or cancel the card or display/viewing of the value card if fraud (e.g. fraud security rules) or other stop transaction conditions are identified. Such limited access to the card would be generally represented by a "deactivated" card in the associated POS or third party stored value card tracking service. The deactivation communication may thus be relayed between the ECD value card manager and the third party value card tracking system or service.

Upon receipt of one or more notification communications, and where no stop transaction conditions have been identified, the customer of the value card may view the value card in a browser or other suitable display. Different security methodologies such as unlock codes for viewing the value card may be employed to verify that the intended recipient is opening the value card. Regardless of whether the update to the merchant's stored value tracking service software occurs manually, automatically or semi-automatically, assuming that no fraud intervention has occurred, a value card is now associated with a merchant's current stored value tracking system. A customer may print and physically present the printed value card, or otherwise present the value card, to a merchant for use, at 214.

At 216, upon presentation of the value card to the merchant (such as the printed electronically delivered value card), the merchant may enter the value card's identifier in the merchant's stored value tracking system or service. For example, the merchant may input, (e.g., manually, through a bar code scanner, etc.) the identifier, printed value card may be presented to the merchant and the merchant may input into the merchant's stored value tracking system when a customer presents the value card to the merchant. The electronically issued value card is then recognized by the merchant's stored value tracking system in the same manner as if a plastic gift card or a paper certificate had been issued and presented to the merchant. As such, the electronically delivered value card is now able to be used from within the merchant's stored value tracking system while the delivery of that certificate and ability to view that certificate is held within the ECD value card manager.

At 218, the merchant's stored value tracking system or service software may communicate back to the ECD value card manager, via for example an API or other process. The communication may provide a notification to the ECD value card manager that the electronically delivered value card was successfully used within the merchant's stored value tracking system or service thereby disallowing the any additional viewing or reissuance of a value card via electronic means.

Further, in some embodiments, a tracking system may be provided to allow the customer the ability to retrieve processing status of the electronically delivered value card, for example through the steps defined above. An electronically issued gift card may be in one of several stages recited above.

It should be appreciated that the merchant can easily switch between different POS software companies or gift card tracking services, and then update the ECD value card manager with a new numbering/barcode methodology and/or sales processes to continue to issue their gift cards/certificates in an electronic fashion.

It should also be appreciated that the systems and methods herein provide a platform for integrating the value card market, allowing a merchant's store, whether it is an online store or a local store, the ability to accept and process value cards offered by various vendors using their existing merchant's stored value tracking systems, whether it is electronically delivered value cards or physical (e.g., plastic) value cards. Furthermore, the systems and methods may speed up processing of the value cards when they are presented to be redeemed, such as at time of purchase.

FIGS. 3-7 provide exemplary screenshots of an implementation of the system and methods described above.

Figure 3:
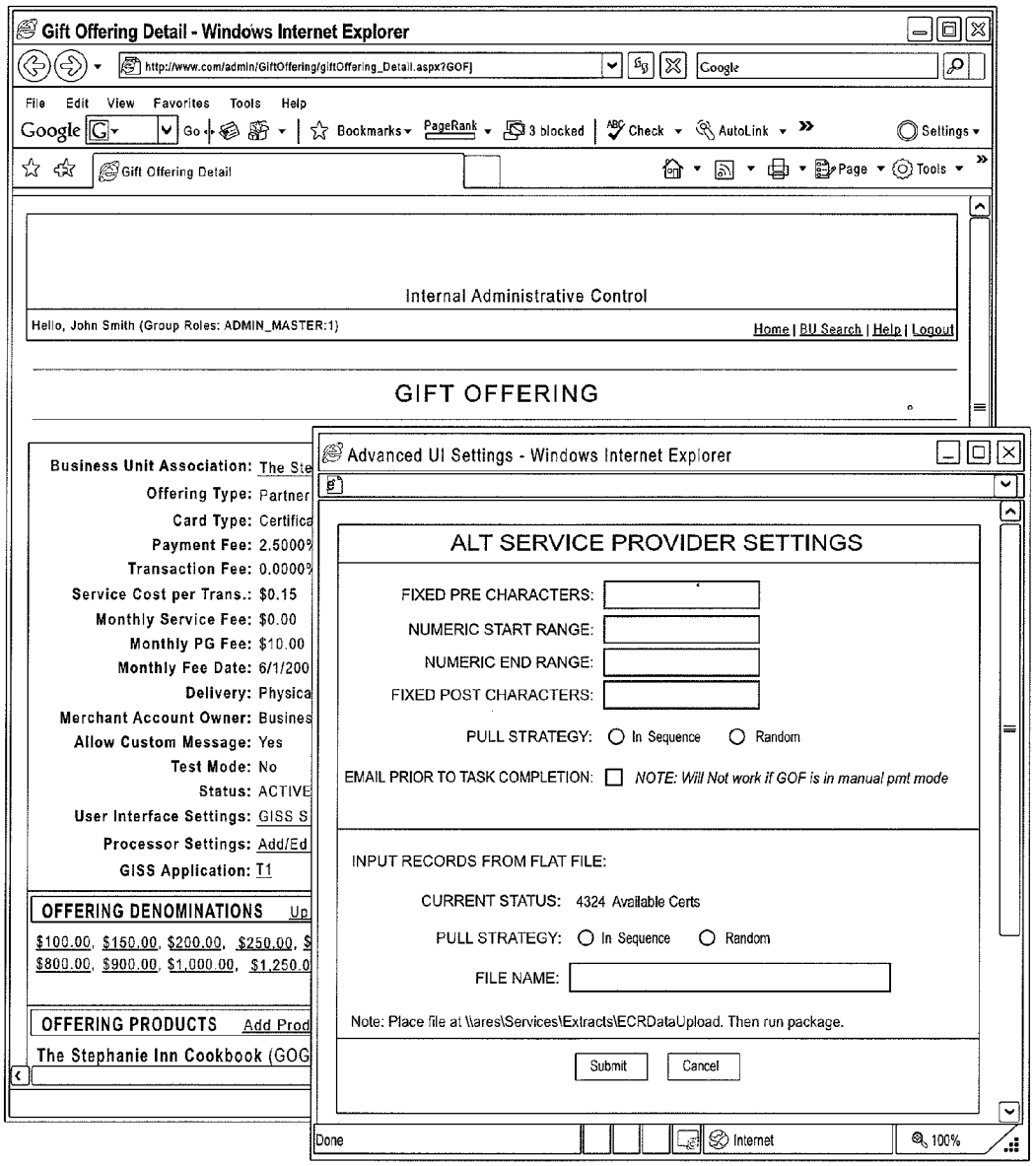
FIG. 3 is an exemplary screenshot of a backend value card system setup for integration to the Gift Card Service Provider used by that merchant.

Turning now to FIG. 3, FIG. 3 is an exemplary screenshot of a backend value card system setup for integration to the Gift Card Service Provider used by that merchant. For example, FIG. 3 illustrates an example screenshot utilized to input identifiers, such as barcodes, magnetic stripe data or other unique numbering structures, into the ECD value card manager. For example, during setup, fixed characters may be set, third party software identified, or file with the unique identifiers indicated. The ECD value card manager associates these identifiers to enable issuance of an electronically delivered value card. It should be appreciated that the settings can be changed at anytime, to a completely different numbering scheme if necessary.

Figure 4:
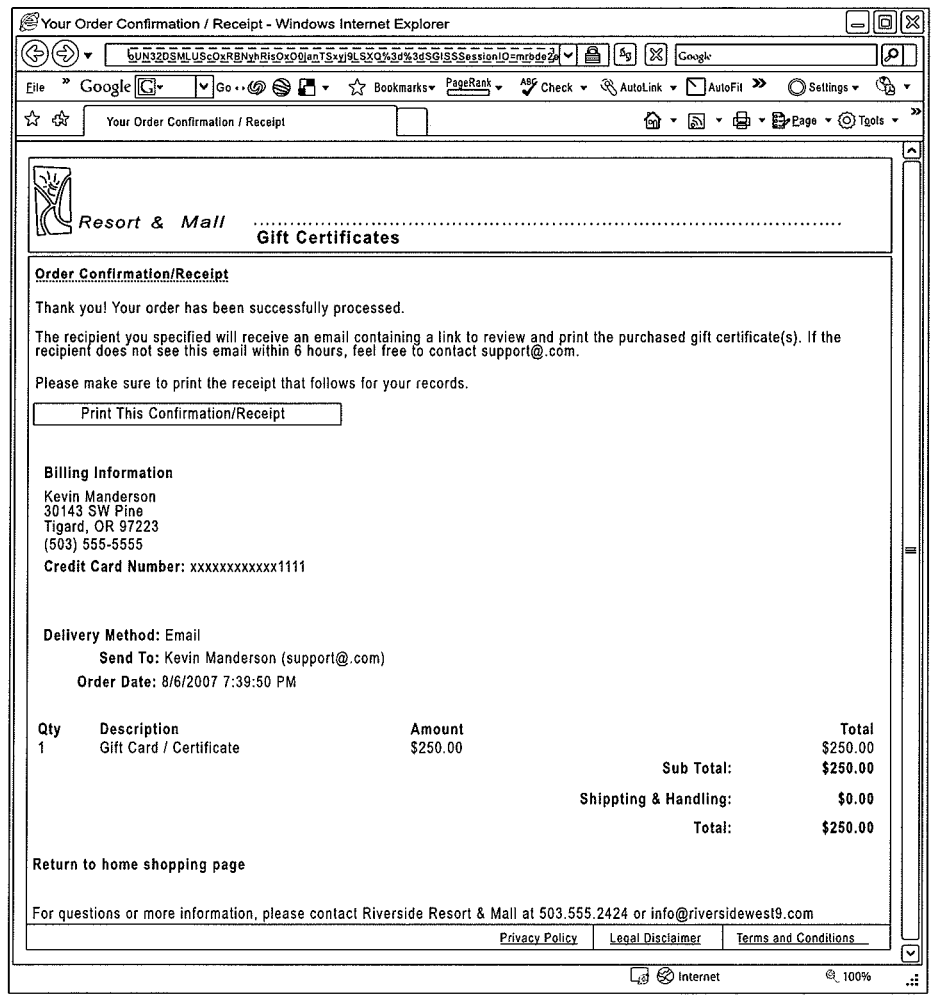
FIG. 4 is an exemplary screenshot of an example purchase confirmation produced by the systems and methods for confirming the online purchase of a value card.

FIG. 4 is an exemplary screenshot of an example purchase confirmation for a customer. The purchase of the value card may happen through ECD value card managers, through the merchant's servers or through third party servers, or even through purchase via a mobile or other electronic device (such as a kiosk). As an example, the electronically delivered value card delivery process may be kicked off through an API connection or direct use of ECD value card manager servers at the client's location, or a combination of the above working together.

Figure 5A:
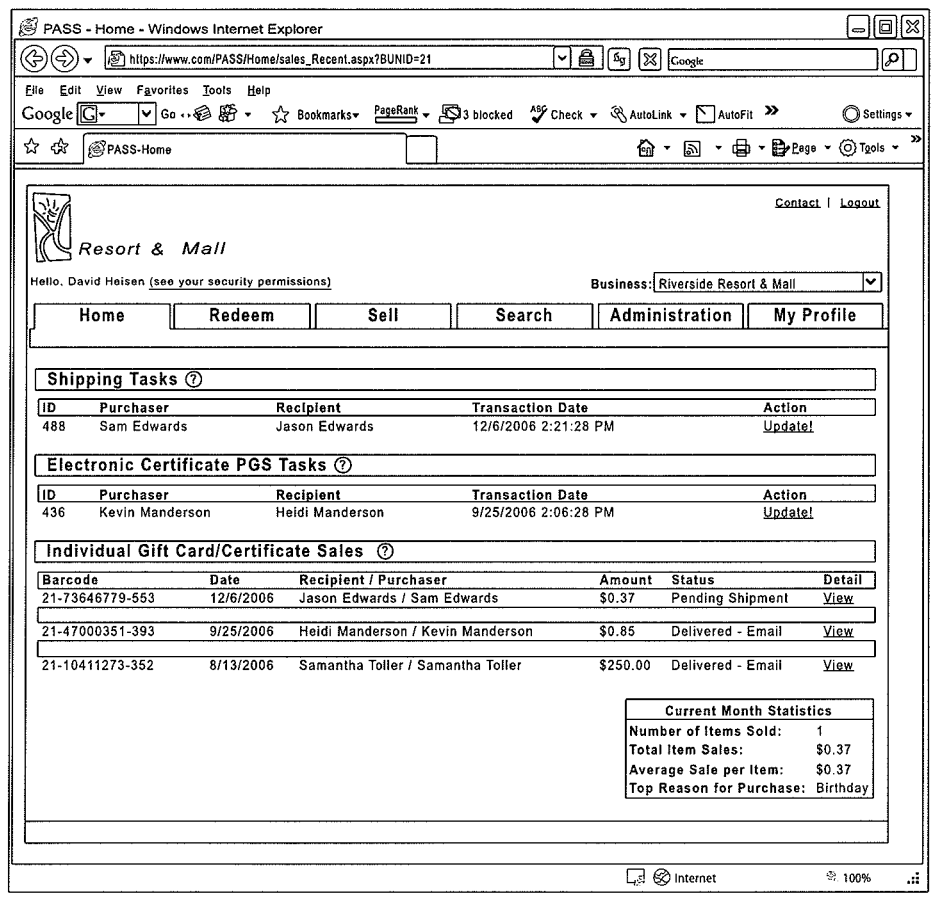
FIG. 5A is an exemplary screenshot of an example merchant stored value tracking system task list.

FIG. 5A is an exemplary screenshot of merchant task list. As an example, a task list is shown. Where the merchant can use this information to update POS software solution with a gift card module. The task list may include merchant validation tasks, such as requests that the purchase of an electronically delivered value card by Kevin Manderson be updated. In this example, after receiving notification that the merchant has a task, the merchant can log in to an administration area where they can see their outstanding tasks. Other example tasks on this page could deal with fraud control, errors encountered during automated task completion, or other system related tasks used to manage the flow of electronically issued value cards.

Figure 5B:
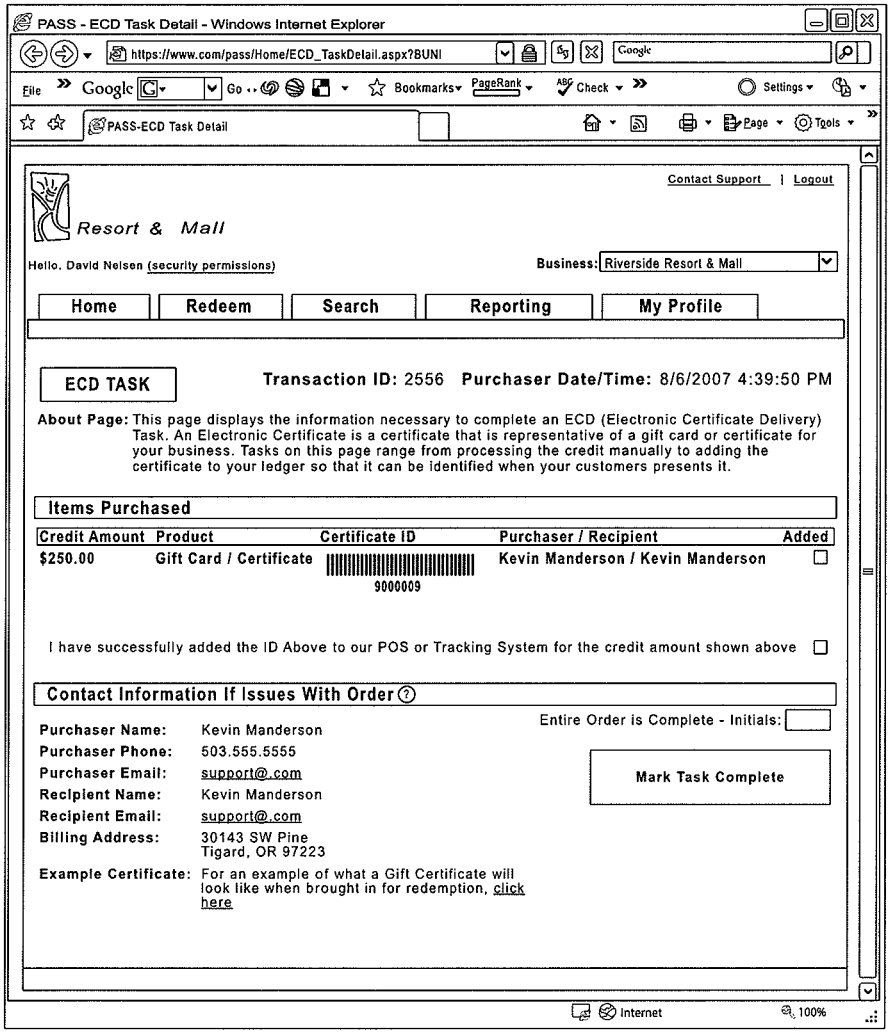
FIG. 5B is an exemplary screenshot of a merchant stored value tracking system task to be completed by a merchant.

FIG. 5B is an exemplary screenshot of a merchant validation task to be completed by the merchant. As described, the page may display information necessary to complete an electronic certificate delivery task. Tasks may include, but are not limited to, processing credit card data as well as adding value card information to the merchant's ledger (or 3rd party card value system) so that it may be identified as authentic when the customer presents the electronically delivered value card to the merchant. In some embodiments, the electronic certificate may be automatically connected to the stored value tracking system; however it should be realized that there are many different ways to connect with the merchant's stored value tracking system and such tasks and tasks list are provided as examples only. As illustrated, the system may utilize input from the identifiers previously set by the merchant with the ECD value card manager. Typically, these settings can be changed at anytime, to a completely different numbering scheme if necessary. If the business has a barcode scanner, they can simply scan the bar code and enter the credit amount for the certificate into whatever tracking software they utilize.

Figure 6:
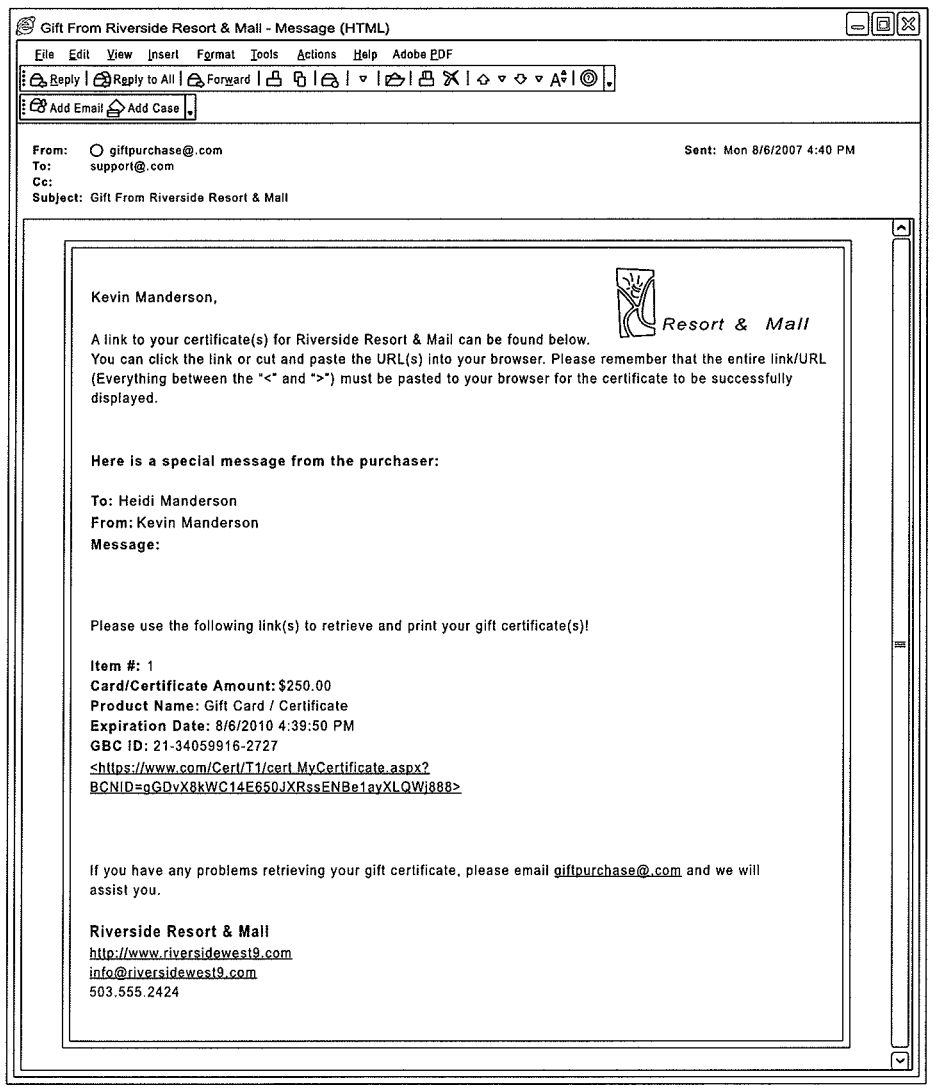
FIG. 6 is an exemplary screenshot of an email delivered to a customer containing a URL link to an electronic certificate.

FIG. 6 is an exemplary screenshot of a notification communication regarding the value card display. Specifically, FIG. 6 shows an email sent to the customer that includes the certificate URL Link. If the customer had purchased more certificates there would be a link for each one. When the link is clicked, they are able to view and then utilize their certificate as shown in FIG. 7.

Figure 7:
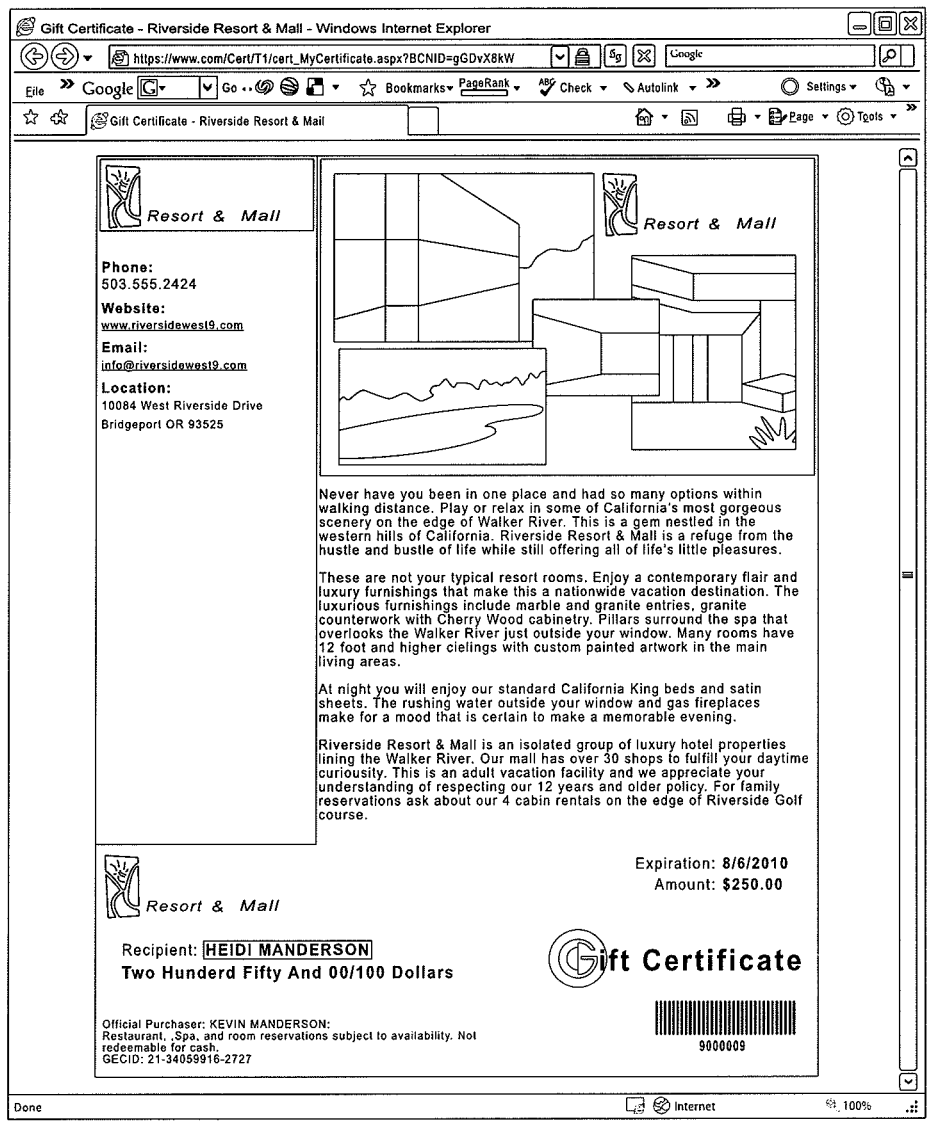
FIG. 7 is an exemplary screenshot of an electronic certificate.
Figure 8:
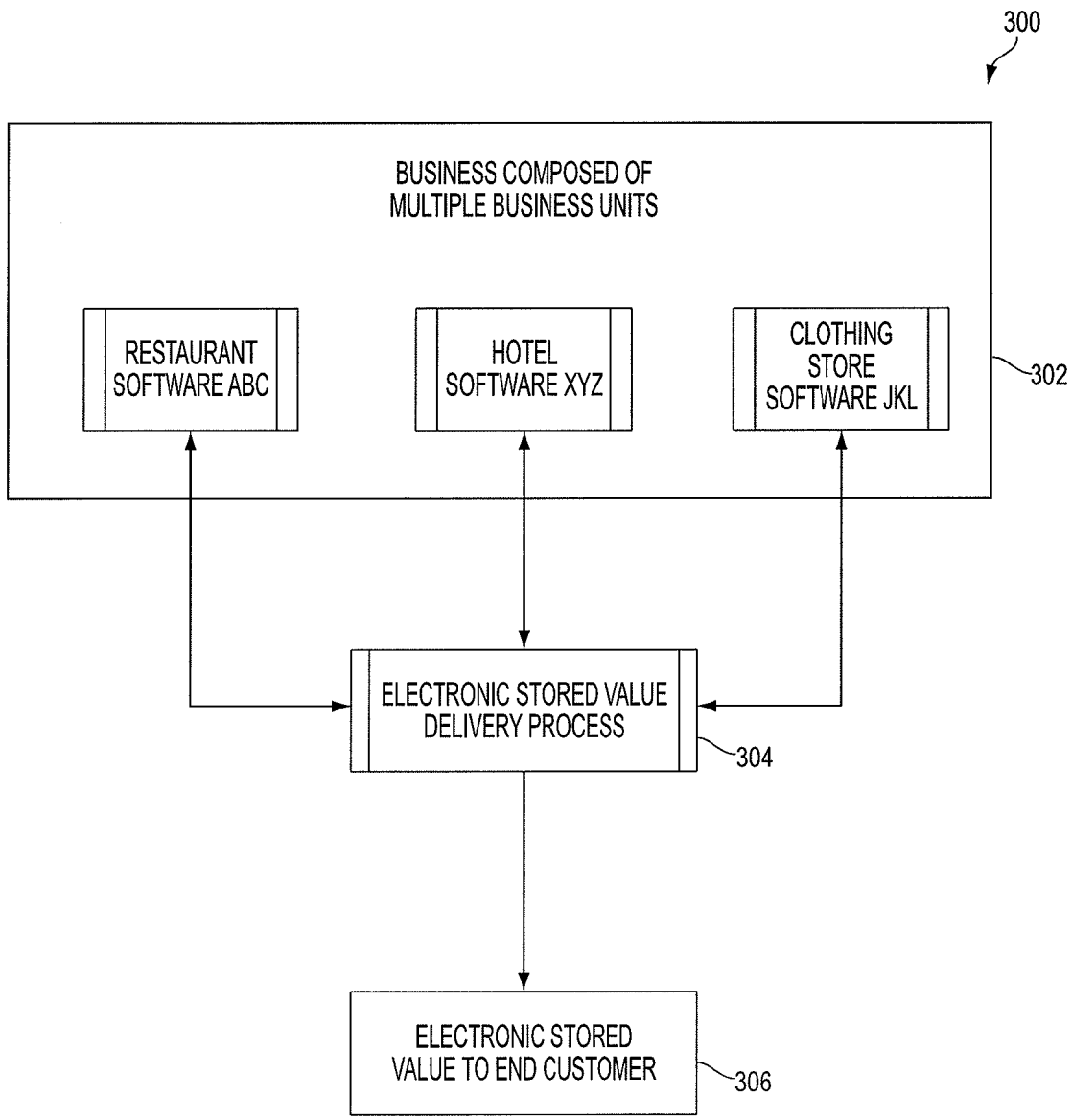
FIG. 8 is a schematic illustration of an example implementation of the system disclosed herein.

FIG. 7 is an exemplary screenshot of an electronic certificate (or electronically delivered value card display). In the illustrated example, the value card includes the identifier that was previously entered into the stored value tracking system during the electronic certificate task (manual or automated). When this value card is presented to the merchant, and then scanned (or otherwise entered into the merchant's system), it will be recognized and utilized in the same manner as any of the plastic cards that the merchant physically issued FIG. 8 is a schematic illustration of an example embodiment 300 of a system for delivering and managing electronically delivered value cards. As an example, a merchant may have different business units 302. Because each of the business units is so different from each other, a different gift card program utilizing different gift card tracking system may be utilized. As an example, the restaurant business unit may issue gift cards that are compatible with one gift card tracking software, the hotel business unit may issue gift cards that are compatible with another gift card tracking software, and the clothing store business unit may issue gift cards that are compatible with yet another gift card tracking software. However, the disclosed systems and methods for electronic delivery and management of stored value may be utilized to harmonize different gift card programs and enable the merchant to utilize a single electronic delivery process 304 to delivery and manage all the gift cards 306 maintained by different gift card programs, and ensure that the gift cards issued on behalf of all the gift card programs are compatible with the merchant's stored value tracking system.

FIG. 8 is provided as an example application. However, it should be noted that the value card manager functions as a translator to enable translation between different merchant POS systems, different gift card service providers as well as different e-commerce or shopping cart providers. Currently, the merchant POS systems are limited in ability to communicate with online shopping carts and can only offer limited functionality with the gift card service provider selected by the merchant. The value card manager provides a common platform or value card language for use by the various providers, e.g. the gift card service providers, the merchant POS systems, and the shopping cart services. The common platform uses the provider's data and information and translates the data to a common platform to enable use of the data and information in other systems. The value card manager minimizes the need for the service provider, e.g. the merchant, POS provider, gift card service provider, etc., to purchase new POS systems to accommodate electronic value card services and enables a merchant to easily switch to a different gift card service provider. Moreover, by using the value card manager, additional services can be offered by the merchants.

Figure 9:
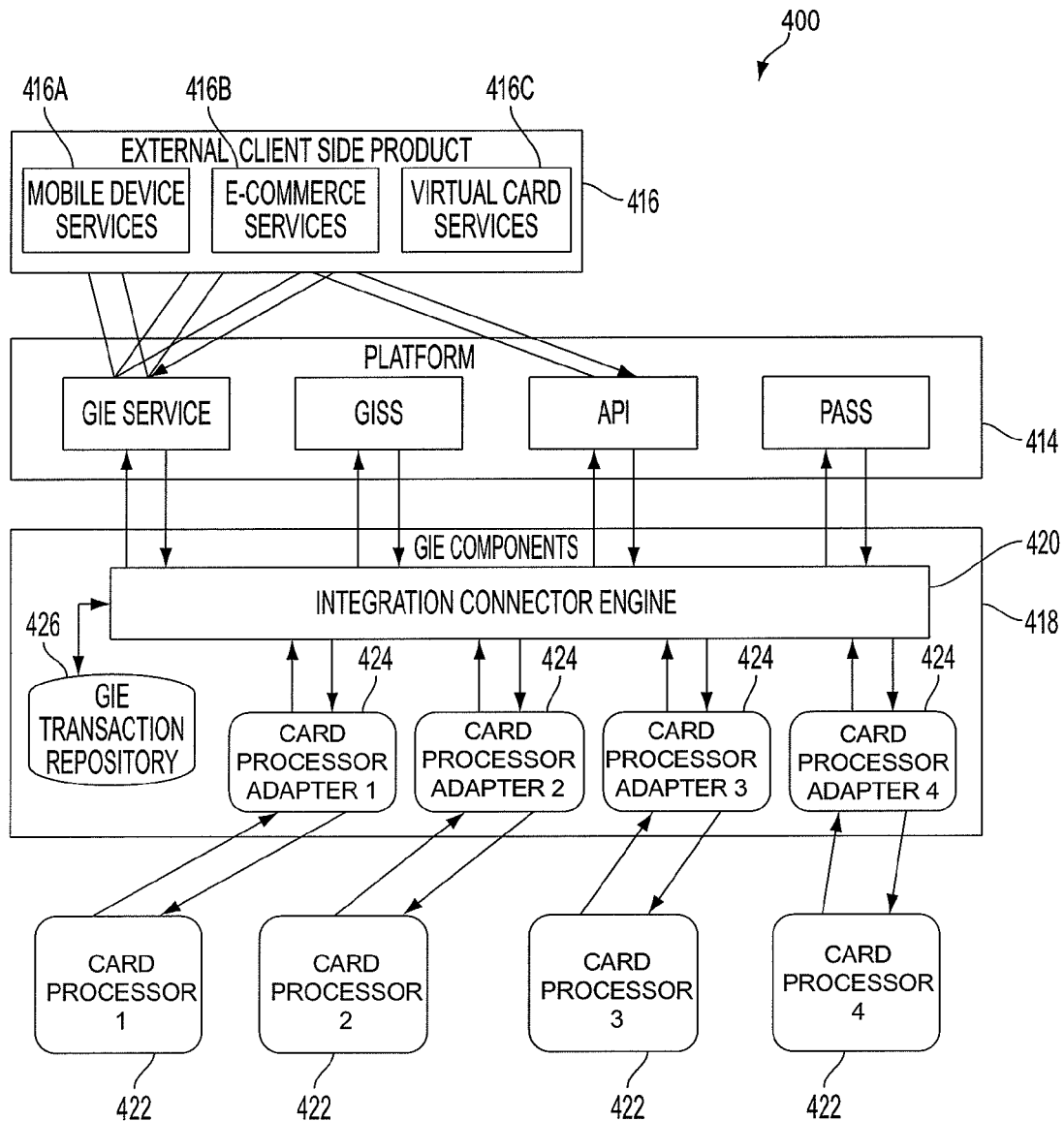
FIG. 9 is a schematic illustration of another example implementation of the system disclosed herein.

FIG. 9 provides a schematic illustration of an example embodiment of a value card management system disclosed herein for delivering and managing value cards and for generating a common platform for use with a plurality of service providers. Regardless of the service provider's program or data requirements, the common platform enables the various service providers and merchants to exchange data and transfer products, such as value card products and services between the different providers. As an example, the value card management system 400 is shown to include a common platform or data manager 414 for communicating with external client side products 416, such as mobile device services 416A, e-commerce services 416B, and virtual card services 418C. The value card management system 400 is also shown to include card integration components 418. The GIE components 418 may include an integration connector engine 420 that is in communication with various card processors 422 via various card system adaptors 424 for the various card processors 422 of the GIE components 418. The GIE components 418 may also include GIE transaction repository 426 for storing card transaction information.

As described above, the disclosed systems and methods provide merchants the ability to sell electronically delivered value cards, and efficiently and cost-effectively enable redemption of such value cards using a merchant's current stored value tracking system. For example, the disclosed systems and methods enable an effective sales solution that coordinates issuance of electronic value cards with a merchant's POS system and/or third party value tracking system or service.

This horizontal approach to the market, where different businesses or merchants utilize multiple different third party gift card tracking services and/or merchant's POS software solutions while still having the ability to electronically issue value cards, enables integration of the systems and provides a common interface for different merchants. Further, POS software companies may incorporate the integration solution to provide electronic gift card features to their customers. Such systems enable merchant freedom as merchants are able to easily switch between multiple gift card companies or tracking systems while utilizing the same service to issue and manage their gift cards electronically.

The above systems and methods may be utilized as an ecommerce sales solution. In some embodiments, an API approach may be provided where a merchant sells the value card through their own ecommerce setup such as a website, but then utilizes the above systems and methods to issue and provide tracking and authentication of the value card. In other embodiments, a merchant may directly install the above systems or applications for merchant specific processing of value cards on their own servers. As such, the disclosed systems and methods may be provided under an Application Service Provider (ASP) model as well as a software installation model.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein.

Inventions embodied in various combinations and subcombinations of features, functions, elements, and/or properties may be claimed in a related application. Such claims, whether they are directed to a different invention or directed to the same invention, whether different, broader, narrower or equal in scope to any original claims, are also regarded as included within the subject matter of the inventions of the present disclosure.

I claim:

1. A method for electronic delivery of stored value to be implemented by an electronic value card manager in selective communication with a first merchant stored value tracking system and a second merchant stored value tracking system, the method comprising:
receiving, by the electronic value card manager, one or more identifiers from the first merchant stored value tracking system and receiving one or more identifiers from the second merchant stored value tracking system, wherein the first and second merchant stored value tracking systems are different systems that operate on different platforms and the electronic value card manager functions as a translator to enable communication between the electronic value card manager and each different system, thereby integrating different merchant stored value tracking systems;
receiving a request for an electronic value card at the electronic value card manager;
associating, by the electronic value card manager, an identifier with the electronic value card, the identifier previously received from the first merchant stored value tracking system or the second merchant stored value tracking system;
synchronizing, by the electronic value card manager, the first or second merchant stored value tracking system with the electronic value card and associating the electronic value card with the first or second merchant stored value tracking system;
temporarily holding, by the electronic value card manager, value of the electronic value card until the value can be passed to one of the first or second merchant stored value tracking system; and
delivering the electronic value card to a customer, wherein delivering includes delivering the identifier associated with the electronic value card to the first or second merchant stored value tracking system, assigning value to the electronic value card for use in the first or second merchant stored value tracking system, and the first or second merchant stored value tracking system updating the electronic value card manager with an updated value of the electronic value card.

2. The method of claim 1, wherein synchronizing includes completing a merchant task.

3. The method of claim 1, wherein assigning the value is delayed until completion of a merchant task.

4. The method of claim 1, wherein the identifier comprises a barcode.

5. The method of claim 1, further comprising validating for potential fraud transactions.

6. The method of claim 1, further comprising providing notice regarding use of the electronic value card in the first or second merchant stored value tracking system.

7. The method of claim 1, further comprising securing the electronic value card for use by the customer.

8. A system for electronic delivery of stored value, the system comprising:
a first merchant stored value tracking system having a first set of identifiers and a second merchant stored value tracking system having a second set of identifiers, the first merchant stored value tracking system being different from the second merchant stored value tracking system in that the first and second merchant stored value tracking systems operate on different point of sale platforms;
a computer network communicatively linked with the first merchant stored value tracking system and the second merchant stored value tracking system; and
a common platform value card manager communicatively linked with the computer network, wherein the common platform value card manager is configured to:
receive the first set of identifiers from the first merchant stored value tracking system and receive the second set of identifiers from the second merchant stored value tracking system,
receive a request for an electronic value card,
associate an identifier with the electronic value card, the identifier previously received from the first merchant stored value tracking system or the second merchant stored value tracking system,
synchronize the electronic value card with the first or second merchant stored value tracking system such that a stored value of the electronic value card is maintained by the first or second merchant stored value tracking system,
temporarily hold value of the electronic value card until the value can be passed to the first or second merchant stored value tracking system, and
deliver the electronic value card to a customer for use in the first merchant stored value tracking system or the second merchant stored value tracking system,
wherein upon presentation of the electronic value card for use in the first or second merchant stored value tracking system, the identifier associated with the electronic value card is recognized by the first or second merchant stored value tracking system, and the first or second merchant stored value tracking system updates the common platform value card manager with an updated value of the electronic value card.

9. The system of claim 8, wherein the common platform value card manager assigns value and automatically synchronizes the electronic value card with the first or second merchant stored value tracking system.

10. The system of claim 8, wherein the common platform value card manager delays assigning value until completion of a merchant task.

11. The system of claim 8, wherein the common platform value card manager periodically synchronizes with the first or second merchant stored value tracking system.

12. The system of claim 8, wherein use of the electronic value card occurs without real time communication between the common platform value card manager and the first or second merchant stored value tracking system.

13. A computing device holding computer-executable instructions for electronic delivery of stored value, the instructions being executable by a networked value card management system to:
- receive a set of identifiers corresponding to a merchant stored value tracking system;
- receive a request for an electronic value card;
- associate an identifier from the set of identifiers with the electronic value card, the identifier received from the merchant stored value tracking system;
- temporarily hold value of the electronic value card until value can be passed to the merchant stored value tracking system;
- synchronize the merchant stored value tracking system with the electronic value card;
- deliver the electronic value card to a customer, wherein the electronic value card is redeemable using the merchant stored value tracking system; and
- update the networked value card management system with an updated value of the electronic value card at the time of a transaction based upon an amount of a stored value redeemed for a purchase.

14. The computing device of claim 13, wherein the merchant stored value tracking system is automatically synchronized.

15. The computing device of claim 13, wherein the merchant stored value tracking system is synchronized upon completion of a merchant task.

16. The computing device of claim 13, further comprising instructions for validating a request for potential fraud transactions.

17. The method of claim 1, further comprising:
- receiving, by the electronic value card manager, an identifier corresponding to a group of one or more merchant stored value tracking systems;
- receiving, by the electronic value card manager, a request for an electronic value card;
- associating, by the electronic value card manager, the identifier with the electronic value card, the identifier corresponding to the group of one or more merchant stored value tracking systems and redeemable with any one or more of the one or more merchant stored value tracking systems;
- synchronizing, by the electronic value card manager, each of the one or more merchant stored value tracking systems in the group with the electronic value card and associating the electronic value card with the group; and
- delivering the electronic value card to a customer, wherein delivering includes delivering the identifier corresponding to the group and assigning value to the electronic value card for use in any merchant store corresponding to the group.

* * * * *